(12) United States Patent
Roy

(10) Patent No.: US 7,621,234 B2
(45) Date of Patent: Nov. 24, 2009

(54) BRUSH FOR REMOVAL OF HAIR

(75) Inventor: Chan Chi Wai Roy, Hung Hom (HK)

(73) Assignees: Topet USA, Inc., Morrison, CO (US); Topet International Co., Limited, Kwun Tong, Kowloon (HK)

( * ) Notice: Subject to any disclaimer, the term of this patent is extended or adjusted under 35 U.S.C. 154(b) by 73 days.

(21) Appl. No.: 11/562,350

(22) Filed: Nov. 21, 2006

(65) Prior Publication Data

US 2007/0169720 A1 Jul. 26, 2007

Related U.S. Application Data

(60) Provisional application No. 60/738,955, filed on Nov. 21, 2005.

(51) Int. Cl.
*A01K 13/00* (2006.01)
(52) U.S. Cl. .................... 119/628; 119/613
(58) Field of Classification Search .......... 119/600, 119/601, 611, 612, 613, 614, 615, 616, 623, 119/624, 625, 628, 629; 15/27, 48; 132/119
See application file for complete search history.

(56) References Cited

U.S. PATENT DOCUMENTS

| | | | | |
|---|---|---|---|---|
| 594,732 A * | 11/1897 | Fretwell | ...................... | 15/27 |
| 749,727 A | 1/1904 | Fredericks | | |
| 761,952 A * | 6/1904 | Fredericks | .................. | 15/27 |
| 894,011 A * | 7/1908 | Kampfe | ...................... | 15/48 |
| 1,764,626 A | 6/1930 | Heckman | | |
| 5,412,828 A * | 5/1995 | Kuhlmey et al. | ............. | 15/27 |
| 6,681,775 B2 | 1/2004 | Wang | | |
| 6,698,626 B2 | 3/2004 | McKay | | |
| 6,779,220 B1 * | 8/2004 | Raffa | ...................... | 15/142 |
| 2003/0033681 A1 | 2/2003 | Blum et al. | | |

\* cited by examiner

*Primary Examiner*—T. Nguyen
(74) *Attorney, Agent, or Firm*—Marsh Fischmann & Breyfogle LLP (57) ABSTRACT

A brush that is adapted to remove hair from a domestic animal, such as a dog or cat. The brush includes a rotatable bristle pad having a plurality of bristles for removal of loose hair from the animal. A cleaning comb is disposed proximal to the bristles such that the cleaning comb overlaps the bristles to remove hair from within the bristles during use. The removal of hair from within the bristles advantageously reduces clogging of the bristles and maintains the ability of the bristles to remove additional hair.

19 Claims, 7 Drawing Sheets

BRUSH FOR REMOVAL OF HAIR

CROSS-REFERENCE TO RELATED APPLICATIONS

This application claims priority to U.S. Provisional Application No. 60/738,955 entitled SELF-CLEANING BRUSH and filed Nov. 21, 2005, the disclosure of which is incorporated herein by reference in its entirety.

BACKGROUND OF THE INVENTION

1. Field of the Invention

The present invention relates to a brush, particularly a hair brush that is useful for removing hair from domestic animals such as dogs and cats.

2. Description of Related Art

Brushes that are adapted to remove hair from domestic animals such as dogs or cats are known in the art. One difficulty that can be encountered when using such a brush is that the bristles can quickly become clogged with animal hair, impairing the ability of the brush to remove additional hair. When brushing animals such as large dogs with large amounts of loose hair, the bristles can quickly become clogged and must be cleaned by removing the hair from the bristles by hand.

It would be advantageous to provide a brush that can remove hair from an animal, such as a dog or a cat, without becoming clogged with the hair during use.

SUMMARY OF THE INVENTION

Accordingly, the present invention provides a brush, particularly one that is adapted to remove loose hair from a domestic animal. The brush can be a self-cleaning brush whereby hair is removed from within the bristles of the brush during use.

According to one embodiment, the brush includes a rotatable bristle pad that includes a plurality of bristles, the bristle pad being rotatable about a rotation axis. A cleaning comb is disposed proximate to the bristle pad, where the cleaning comb has teeth that overlap at least a portion of the bristles to remove loose hair from within the bristles as the bristle pad rotates.

According to one aspect of this embodiment, the cleaning comb is removable from the brush without the use of tools. When removed, the comb can be used as a flea comb to further groom the animal. The bristle pad can be substantially cylindrical or can have an oval-shaped cross-section, similar to a tank track roller assembly. According to another aspect, the brush further includes a handle having a gripping portion adapted to be gripped by a user. The handle can lie substantially transverse to the rotation axis of the bristle pad or can lie substantially along the rotation axis. The brush can also include a rotatable knob that is adapted to manually rotate the bristle pad to remove hair from within the bristles. To facilitate removal of hair from the brush, the brush can include a top cover having an opening over the cleaning comb so that loose hair removed from the bristles by the cleaning comb can be removed from the brush through the opening.

The present invention also includes a method for removing hair from an animal. According to one embodiment, the method includes placing a brush in contact with the fur of an animal, the brush comprising a rotatable bristle pad having bristles, and moving the brush along the fur to cause the bristle pad to rotate and remove loose hair from the fur. Hair is collected from within the bristles using a comb that overlaps the bristles during the moving step. The collected hair can be removed from the vicinity of the comb after use.

DESCRIPTION OF THE INVENTION

Figure 1:
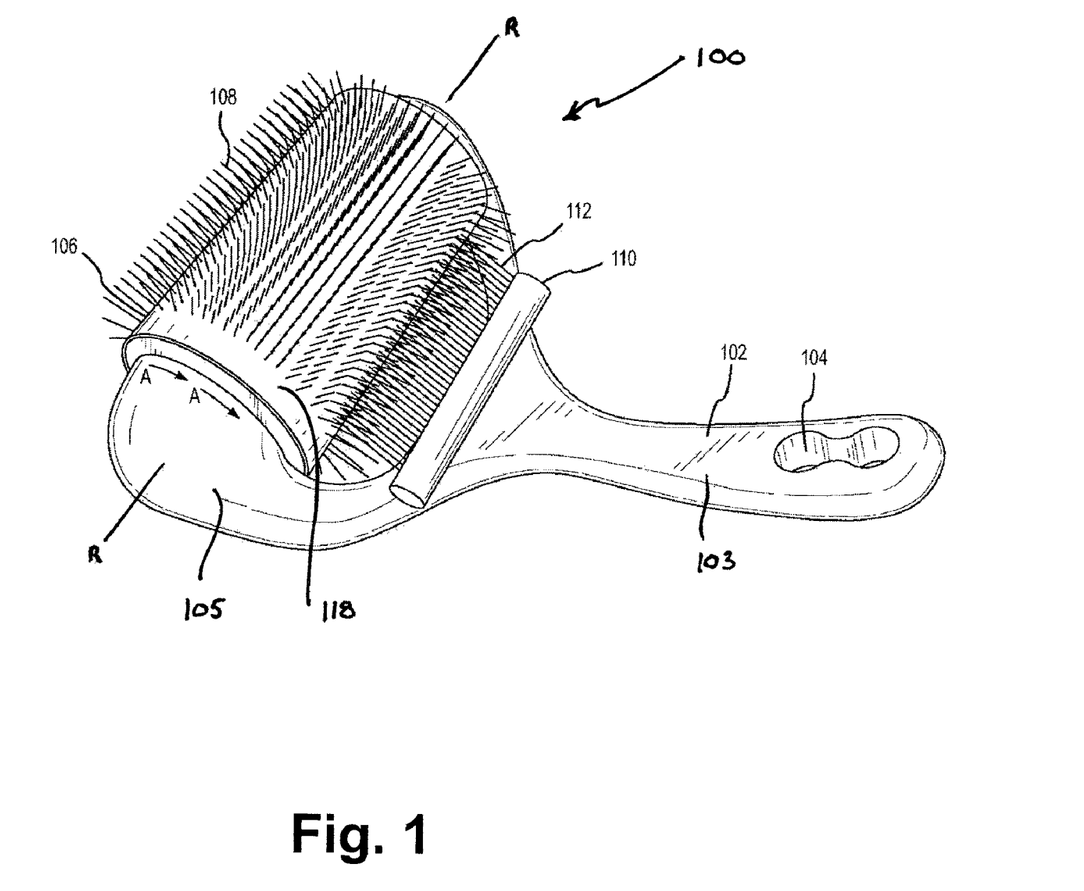
FIG. 1 illustrates a perspective view of a brush according to an embodiment of the present invention.

FIG. 1 illustrates an embodiment of a brush according to an embodiment of the present invention. The brush is a self-cleaning brush that can be used to remove loose hair from a domestic animal, such as a dog or cat; however, the applications of the brush are not limited thereto. The brush 100 includes a handle 102 to enable the user to easily hold and manipulate the brush 100 during use. The handle 102 can also include an aperture 104 or similar means for mounting and storing the brush 100. The handle 102 can be fabricated from a variety of materials, such as molded plastic or wood.

The brush 100 includes a rotatable bristle pad 106 that is capable of rotation about a rotation axis R. The bristle pad 106 includes a plurality of bristles 108 that protrude from a bristle support pad 118 and can generally be disposed vertically with respect to the support pad 118 and extend outwardly therefrom. During use, the brush 100 is placed against the fur of the animal with the bristles 108 directly contacting the fur. The brush is moved across the fur while applying moderate pressure, such as by gripping the handle 102 and pulling the brush toward the user and across the fur of the animal. As the brush 100 is moved across the fur of the animal, the bristles 108 rotate to remove loose hair from the animal due to the close proximity among the bristles 108 and the relative upward lifting motion of the bristles 108 caused by the rotation of the bristle pad 106.

The rotatable bristle pad 106 can be generally cylindrical in shape to enable rotation. The rotatable bristle pad 106 can also be configured in other shapes, such as an oval shape (i.e., an oval cross-section) whereby the bristle pad rotates in a manner similar to tank tracks to provide an increased surface area for hair removal.

In the embodiment illustrated in FIG. 1, the handle 102 is "Y" shaped, including a gripping portion 103 at a first end and a bristle pad mounting portion 105 at an opposite end, such that the rotatable bristle pad 106 is mounted in the end of the handle 102 opposite the gripping portion 103. For example, the bristle pad 106 can be mounted on a rigid axle or the ends of the bristle pad 106 can be secured in a way to permit relatively free rotation when the bristles 108 are dragged across the fur of an animal. In the embodiment illustrated in FIG. 1, the gripping portion 103 extends along an axis that is transverse to the rotation axis R. Other handle positions are possible, including a handle having a gripping portion that extends substantially along the rotation axis R.

The bristle support pad 118 can be fabricated from a variety of materials that are capable of supporting the bristles 108 and is preferably a soft and pliable material such as rubber. The bristles 108 can be fabricated from a variety of rigid and semi-rigid materials such as nylon, plastic or metal. Metals are particularly preferred, such as steel, stainless steel and similar materials. In one embodiment, the rotatable bristle pad 106 is a rotatable slicker pad, that is, one comprising bristles 108 that are slightly angled toward the direction of rotation to enhance the removal of loose hair.

During use, the brush 100 is gripped by a user, the bristle pad 106 is pressed against the fur of the animal and the brush 100 is moved across the fur causing the bristle pad 106 and its associated bristles 108 to rotate. In the embodiment illustrated in FIG. 1, the brush 100 can be pulled toward the user in a manner such that the rotation of the bristle pad 106 is in the direction generally indicated by arrows A.

According to one embodiment, the brush 100 includes a locking mechanism (not illustrated) for locking the rotatable bristle pad 106 to prevent rotation of the bristle pad 106, or to limit rotation of the bristle pad 106 to a single direction. For example, the bristle pad 106 can be temporarily locked to prevent rotation, enabling the bristles 108 to be dragged through the fur in the manner of a non-rotating brush. Thereafter, the bristle pad 106 can be unlocked and used as described above.

The brush 100 can also include a cleaning comb 110 that is disposed proximal to the bristle pad 106 such that the teeth 112 of the comb 110 overlap at least a portion of the bristles 108, such as the distal ends of the bristles 108. As the bristle pad 106 rotates during use, the bristles 108 pass through the teeth 112 of the comb 110 and the comb 110 thereby dislodges loose hair from within the bristles 108. Preferably, the comb 110 is easily removable from the brush 100 such that the comb 110 can be removed and cleaned. For example, the comb 110 can be frictionally engaged in the handle 102 or can be engaged with a simple screw, such as a thumb screw that does not require a tool for removal.

The comb 110 includes teeth 112 that extend into the bristles and overlap at least the distal ends of the bristles 108 to remove hair from within the bristles 108 when the bristle pad 106 is rotated. The comb 110 can be positioned relative to the bristles 108 so that the teeth 112 and the bristles 108 overlap to a varying degree, and preferably the teeth 112 of the comb 110 and the bristles 108 overlap at least about 50 percent of the length of the bristles 108, more preferably overlap at least about 75 percent of the bristle length and even more preferably overlap at least about 90 percent of the bristle length. Sufficient overlap of the comb teeth 112 and bristles 108 will ensure that hair is dislodged from within the space between bristles 108 over substantially the entire length of bristles 108. The teeth 112 can be fabricated, for example, from metal or plastic, and are sufficiently rigid to remove hair from within the bristles 108. The teeth 112 are preferably fabricated from a rigid material such as steel, stainless steel, or plated steel (e.g., plated with nickel or chrome). The diameter of the teeth 112 is preferably sufficient to maintain adequate rigidity and is preferably greater than the diameter of the bristles 108.

The comb 110 is positioned proximal to the bristles 108 such that the teeth 112 extend into and overlap the bristles 108. The relative angle at which the teeth 112 pass through the bristles 108 is preferably such that the removal of hair from within the bristles is maximized.

Figure 2:
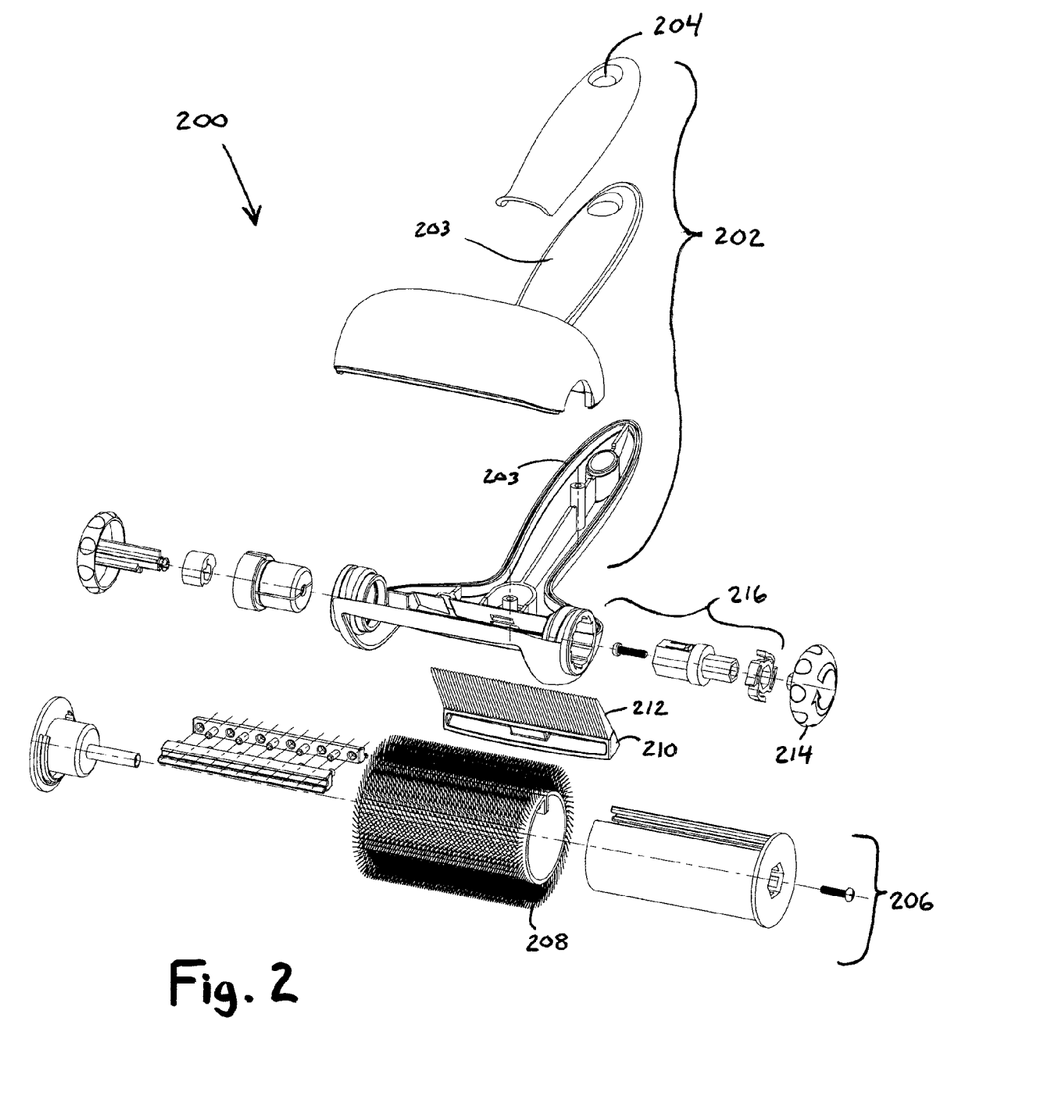
FIG. 2 illustrates an exploded view of a brush according to an embodiment of the present invention.

One embodiment of a self-cleaning brush is illustrated in the exploded view of FIG. 2. The brush 200 includes a handle 202 that is adapted to be gripped by the hand of a user. In this regard, the handle 202 includes a gripping portion 203 including an aperture 204 for mounting and storage of the brush 200.

The rotatable bristle pad 206 is cylindrical in shape such that the bristles 208 can rotate about a rotation axis. The rotatable bristle pad 206 is mounted in a lower cabinet 226 that is integrally formed at an end of the handle 202. The mounting for the rotatable bristle pad 206 can include a locking mechanism 216 that is adapted to restrict the rotation of the rotatable bristle pad 206 in a single rotational direction. The bristle pad 206 is mounted into a lower cabinet 226 that is integrally formed at the end of the handle 202. A comb 210 having teeth 212 is mounted into the lower cabinet 226 such that the teeth 212 engage the bristles 208 to remove hair from within the bristles 208 when the bristle pad 206 is rotated. An upper cover 232 can be placed over the bristle pad 208.

Figure 3:
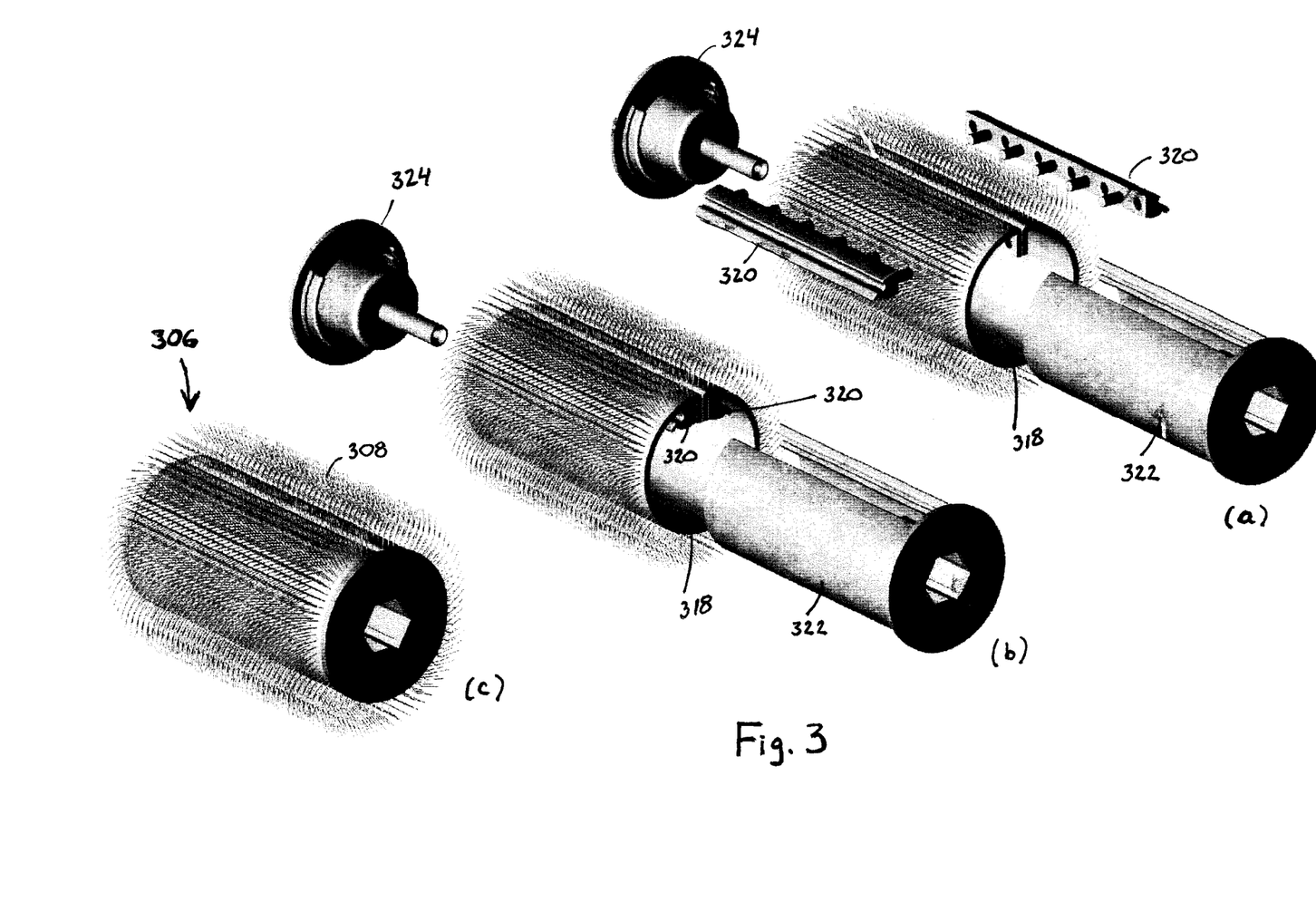
FIGS. 3(a) to 3(c) illustrate the construction of a cylindrical bristle pad according to an embodiment of the present invention.

A more detailed view of a rotatable bristle pad is illustrated in FIGS. 3(a) to 3(c). The rotatable bristle pad 306 includes a bristle support pad 318 that is a generally planar piece of rubber or similar material having bristles 308 extending therefrom. The bristle support pad 318 is wrapped into a cylindrical shape and is secured into such shape with clamping members 320. A cylindrical support 322 is then placed within the bristle support pad 318 to provide a rigid backing for the bristle support pad 318. An end piece 324 is utilized to lock the cylindrical support 322 in place and form the rotatable bristle pad 306.

Figure 4:
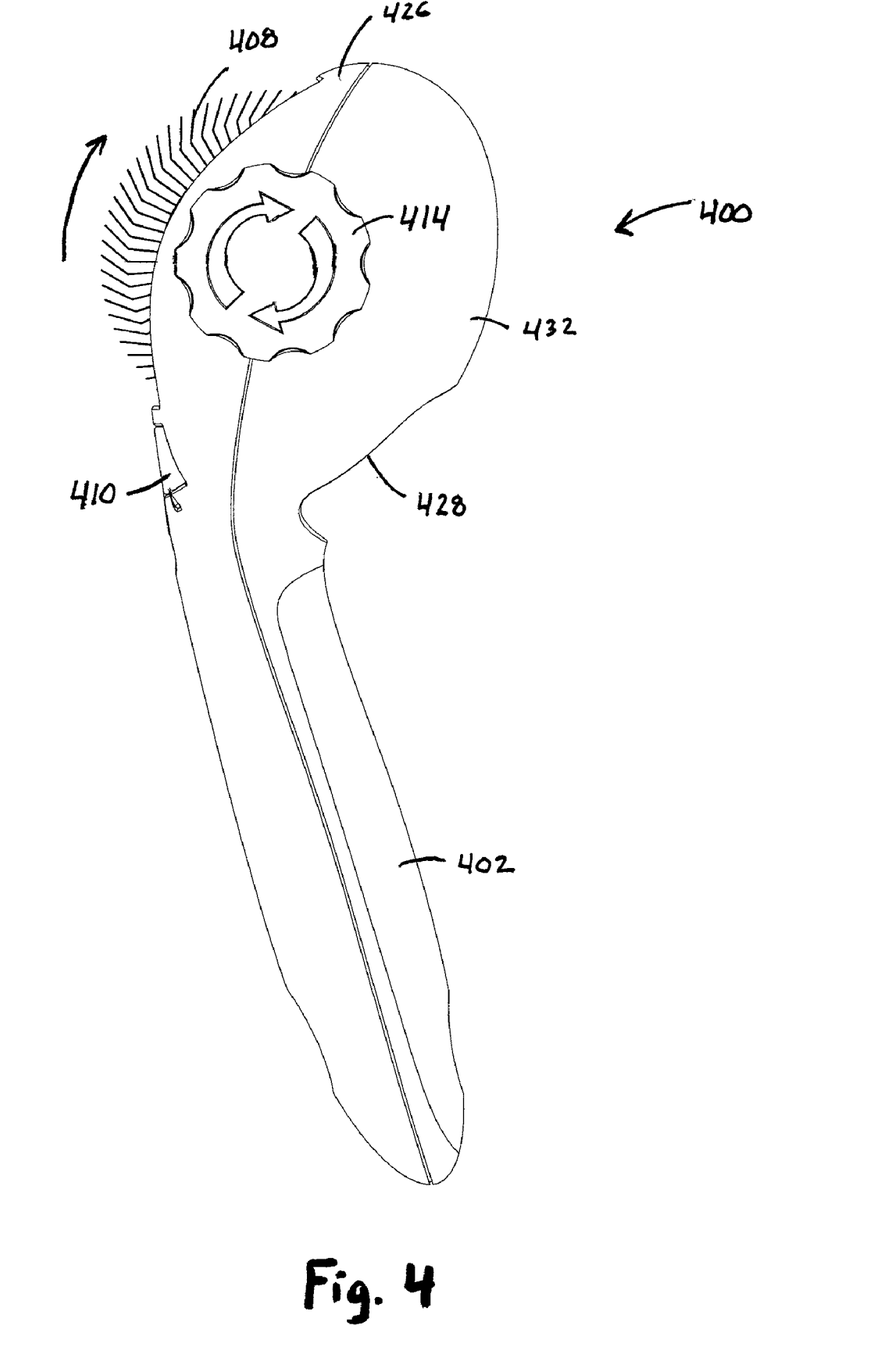
FIG. 4 illustrates a side view of a brush according to an embodiment of the present invention.

FIG. 4 illustrates a side view of a brush according to an embodiment of the present invention. The brush 400 includes a handle portion 402. A rotatable bristle pad includes bristles 408 that protrude from the lower cabinet 426. As is illustrated in FIG. 4, the bristles 408 are slightly angled toward the rotation direction of the bristle pad in a slicker pad configuration. A rotatable knob 414 is provided to enable a user to manually rotate the bristle pad to remove hair from within the bristles 408 by passing the bristles 408 through the comb 410. The comb 410 is inserted into the device and is secured in place. The upper cover 432 of the brush includes an opening 428 to enable hair to be removed without removing the comb 410 from the brush 400.

Figure 5:
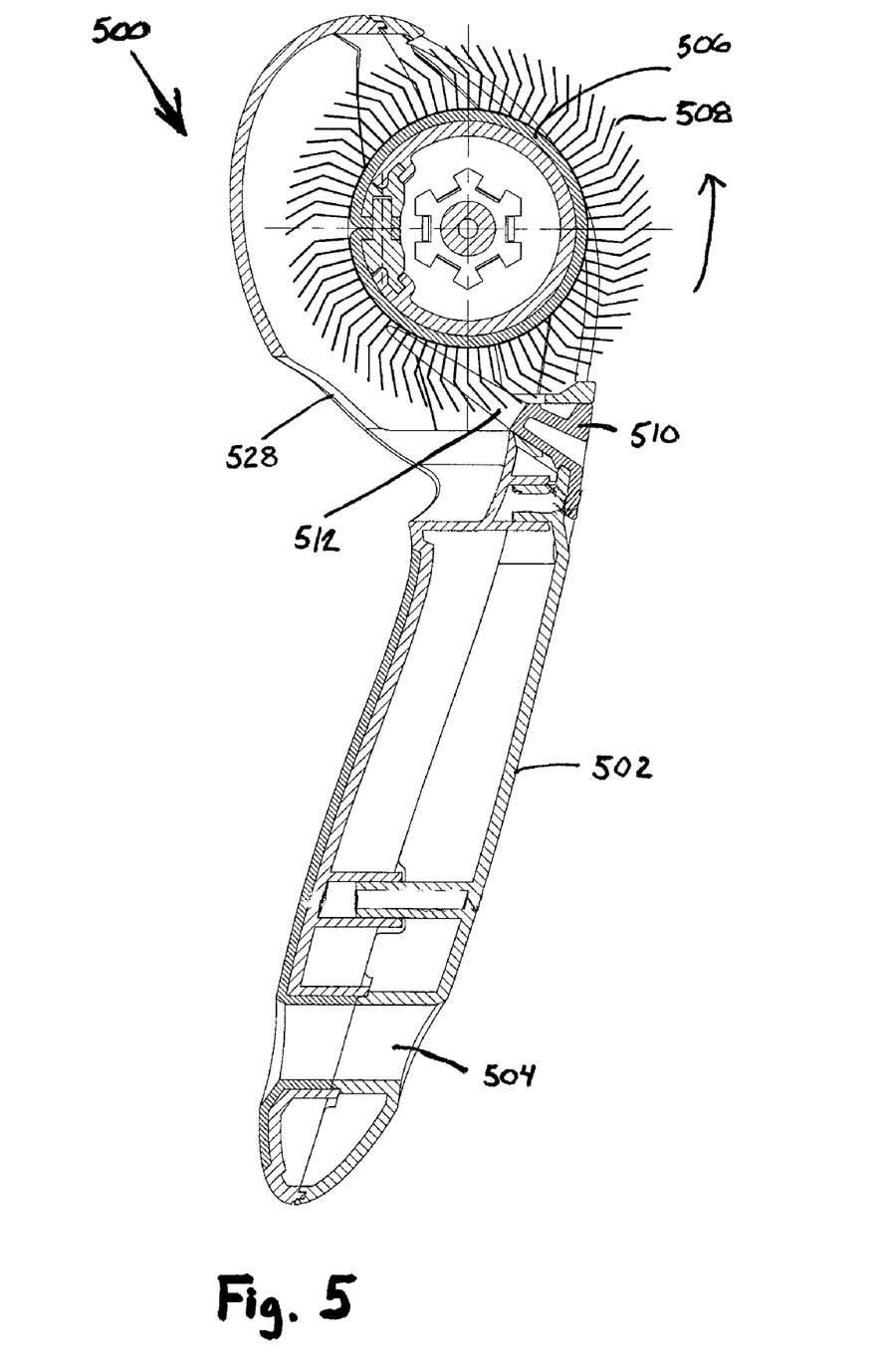
FIG. 5 illustrates a cross-sectional side view of a brush according to an embodiment of the present invention.

FIG. 5 illustrates the rotatable brush of FIG. 4 in a cross-sectional view. The brush 500 includes a rotatable bristle pad 506 having bristles 508. The comb 510 includes a plurality of teeth 512 that overlap with the bristles 508. As is illustrated in FIG. 5, the teeth 512 overlap substantially the entire length of the bristles 508. Further, the teeth 512 are disposed at an angle relative to the bristles 508. In particular, the teeth 512 are disposed relative to the bristles 508 such that when the bristle pad 506 is rotated, the bristles 508 move along the length of the teeth 512 such that the teeth 512 have relative movement from a point near the bristle support pad to a distal end of the bristles, thereby facilitating the lifting of loose hair from within the bristles 508. The upper cover 532 includes an opening 528 to enable hair that has been dislodged from the bristles 508 to be easily removed from the brush 500 without removal of the comb 510.

Figure 6:
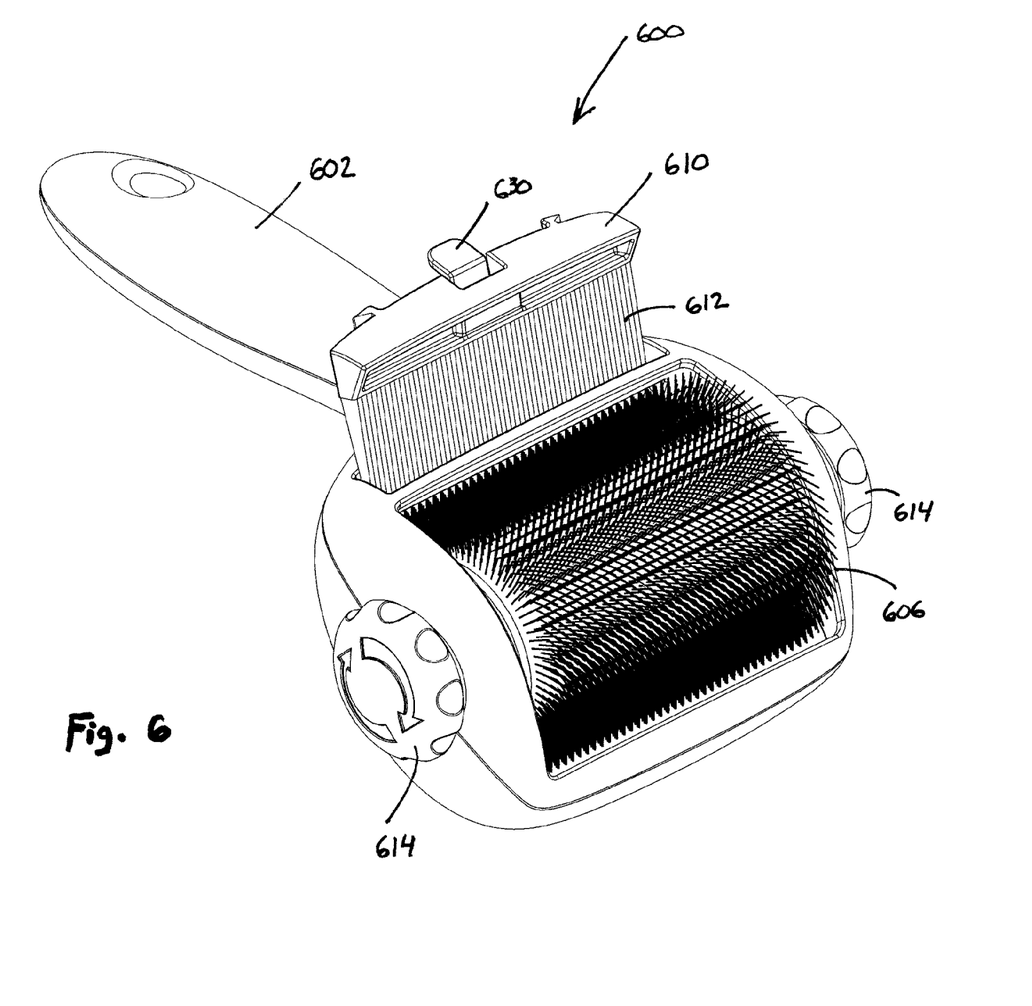
FIG. 6 illustrates a perspective view of a brush according to an embodiment of the present invention.

FIG. 6 illustrates a perspective view of a brush according to an embodiment of the present invention. The brush 600 includes a handle 602 and a rotatable bristle pad 606. In FIG. 6, the comb 610, which includes teeth 612, is partially removed from the brush 600 for purposes of illustration. A rotating knob 614 is provided to enable a user to rotate the rotatable bristle pad 606 to dislodge hair from within the bristles. A tab 630 is provided to secure the comb 610 within the brush.

Figure 7:
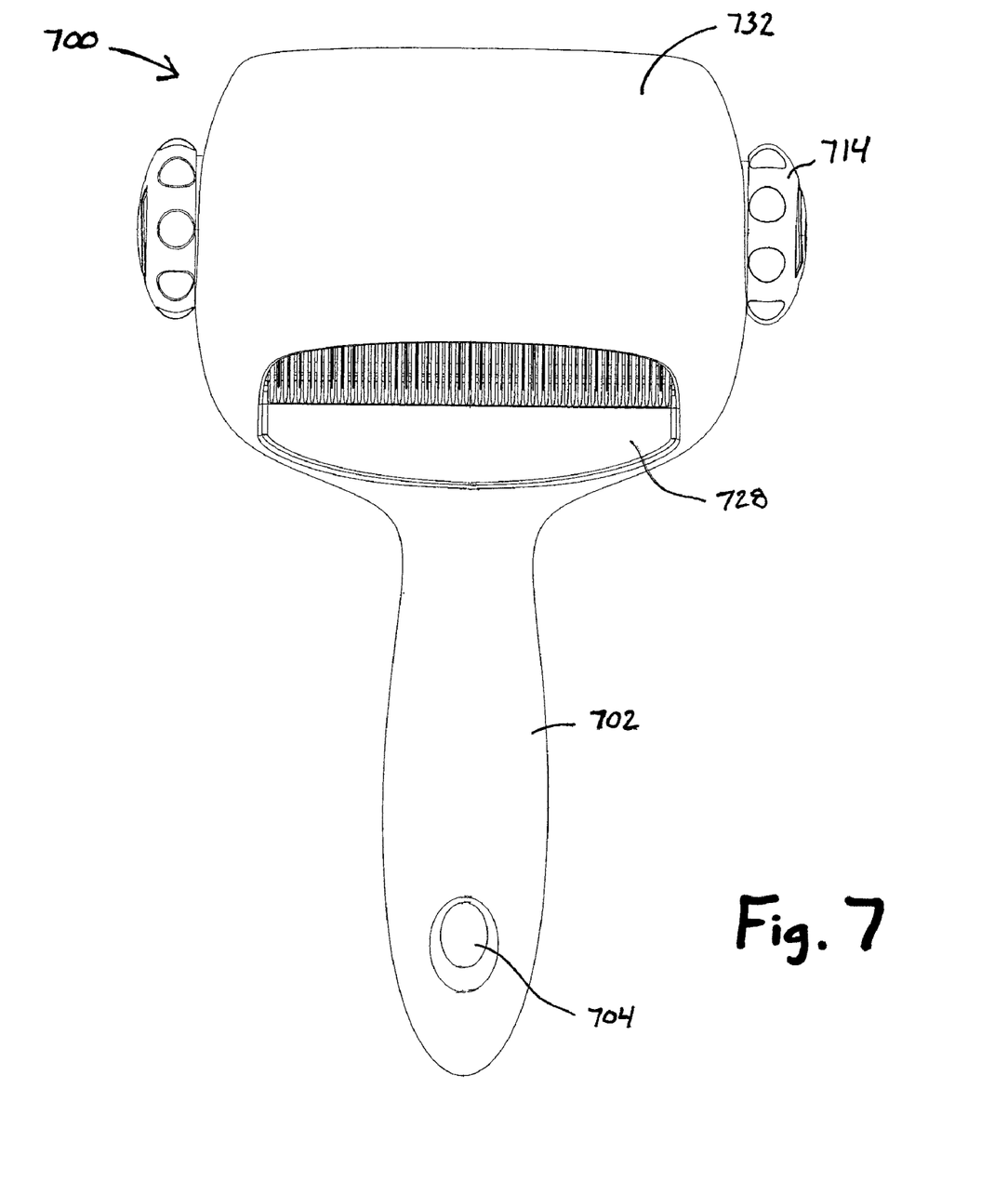
FIG. 7 illustrates a top view of a brush according to an embodiment of the present invention.

FIG. 7 illustrates a top view of a brush according to an embodiment of the present invention. The brush includes a handle 702 having an aperture 704 substantially as is described above. A rotating knob 714 is provided to manually rotate the bristle pad for the removal of hair from within the bristles.

The brush 700 includes an upper cover 732 that at least partially covers the rotatable bristle pad. The upper cover 732 can be fabricated from a transparent or partially transparent material, such as plastic, to enable a user to observe the condition of the bristle pad during use. The upper cover 732 also includes an opening 728 that is disposed above the cleaning comb, particularly the area where the bristles contact the cleaning comb. The opening 728 enables a user to remove loose hair which has been dislodged from within the bristles by the cleaning comb in an efficient manner.

The brush described herein provides a means to continually remove hair from within the bristles during use, thereby improving the ability of the bristles to remove hair from the animal over an extended period of time. The cleaning comb can be removable without the use of tools so that the user can readily remove hair from the cleaning comb as necessary. In addition, the removable comb can be used as a "flea comb" whereby the user can remove the comb from the brush and use the comb individually to comb an animal.

Although described herein in relation to a hair brush, it will be appreciated that the present invention can also be applicable to the other devices for picking up hair and other debris from a surface. For example, the bristle pad described herein could be in the form of a vacuum-style rotary brush. Also, the bristle pad could be replaced by a surface that is adapted to lift and remove loose hair, such as a rubber pad, particularly a textured rubber pad.

It will also be appreciated that although the brush is illustrated as a manually operated brush, the brush could be motorized to provide automated rotation of the bristle pad to enhance the removal of hair.

While various embodiments of the present invention have been described in detail, it is apparent that modifications and adaptations of those embodiments will occur to those skilled in the art. However, is to be expressly understood that such modifications and adaptations are within the spirit and scope of the present invention.

What is claimed is:

1. A self-cleaning brush that is adapted to remove loose hair from an animal, comprising:
   (a) a rotatable bristle pad comprising a plurality of bristles, said bristle pad being rotatable about a rotation axis; and
   (b) a cleaning comb removably inserted on the brush proximate to said bristle pad, said cleaning comb comprising teeth that overlap at least a portion of said bristles when said cleaning comb is secured to the brush to remove hair from within said bristles as said bristle pad rotates during use of the brush.

2. A brush as recited in claim 1, wherein said cleaning comb is removable from said brush without the use of a tool.

3. A brush as recited in claim 1, wherein said rotatable bristle pad is substantially cylindrical.

4. A brush as recited in claim 1, wherein said rotatable bristle pad has an oval cross-section.

5. A brush as recited in claim 1, wherein said brush further comprises a handle having a gripping portion adapted to be gripped by a user.

6. A brush as recited in claim 5, wherein said gripping portion lies along an axis that is substantially transverse to said rotation axis.

7. A brush as recited in claim 5, wherein said gripping portion lies substantially along said rotation axis.

8. A brush as recited in claim 1, wherein said teeth overlap at least about 50 percent of the length of said bristles.

9. A brush as recited in claim 1, further comprising a rotatable knob for manually rotating said rotatable bristle pad.

10. A brush as recited in claim 1, further comprising a cover disposed over at least a portion of said rotatable bristle pad, said cover having an opening which is disposed above an area where said bristles contact said cleaning comb to permit removal of hair from said brush.

11. A self-cleaning brush comprising:
    (a) a rotatable bristle pad comprising a plurality of bristles, said bristle pad having a substantially cylindrical shape and being rotatable about a rotation axis; and
    (b) a cleaning comb secured to the brush proximate to said bristle pad, said cleaning comb comprising teeth that overlap at least about 50 percent of the length of said bristles when said cleaning comb is secured to the brush and as said bristle pad rotates during use of the brush,
    wherein said teeth are disposed at an angle relative to said bristles, whereby said teeth move relative to said bristles from a bottom portion of said bristles to a distal end of said bristles as said bristle pad rotates during use.

12. A brush as recited in claim 11, further comprising an upper cover at least partially covering said rotatable bristle pad, said upper cover comprising an opening which is disposed above an area where said bristles contact said cleaning comb to permit removal of hair from said brush.

13. A brush as recited in claim 11, further comprising a rotation knob to adapted to manually rotate said rotatable bristle pad.

14. A brush as recited in claim 1, wherein said teeth are disposed at an angle relative to said bristles, whereby said teeth move relative to said bristles from a bottom portion of said bristles to a distal end of said bristles as said bristle pad rotates during use.

15. A brush as recited in claim 1, wherein said teeth overlap at least about 75 percent of the length of said bristles.

16. A self-cleaning brush that is adapted to remove loose hair from an animal, comprising:
    (a) a cylindrical bristle support that is freely rotatable about a rotation axis;
    (b) a plurality of bristles extending from said cylindrical bristle support;
    (c) a cleaning comb comprising teeth, said cleaning comb being secured to the brush such that said teeth overlap at least about 50 percent of the length of said bristles when said comb is secured to said brush; and
    (d) a handle having a gripping portion adapted to be gripped by a user, wherein said gripping portion lies along an axis that is substantially transverse to said rotation axis,
    wherein when the brush is placed against the fur of an animal and moved across the fur by pulling the brush toward the user, said cylindrical bristle support freely rotates and said bristles remove loose hair from the animal due to the close proximity among the bristles and the relative upward lifting motion of the bristles caused by the rotation of the bristle Dad and said comb removes hair from within said bristles.

17. A self-cleaning brush as recited in claim 16, further comprising an upper cover at least partially covering said plurality of bristles, said upper cover comprising an opening which is disposed above an area where said bristles contact said cleaning comb to permit removal of hair from said brush.

18. A self-cleaning brush as recited in claim 16, wherein said cleaning comb is removable from said brush without the use of a tool.

19. A self-cleaning brush that is adapted to remove loose hair from an animal, comprising:
   a) a rotatable bristle pad comprising a plurality of bristles, said bristle pad being rotatable about a rotation axis;
   b) a cleaning comb secured to the brush proximate to said bristle pad, said cleaning comb comprising teeth that overlap at least a portion of said bristles when said cleaning comb is secured to the brush to remove hair from within said bristles as said bristle pad rotates during use of the brush; and
   a cover disposed over at least a portion of said rotatable bristle pad, said cover having an opening which is disposed above an area where said bristles contact said cleaning comb to permit removal of hair from said brush.

* * * * *